METHOD OF MAKING A LAMINATED FERRITE MEMORY

Filed Oct. 20, 1965 2 Sheets-Sheet 1

INVENTOR.
CHANDLER WENTWORTH
BY
Carl V. Olson
Attorney

METHOD OF MAKING A LAMINATED FERRITE MEMORY

Filed Oct. 20, 1965 2 Sheets-Sheet 2

INVENTOR.
CHANDLER WENTWORTH
BY
Carl V. Olson
Attorney

United States Patent Office 3,505,139
Patented Apr. 7, 1970

3,505,139
METHOD OF MAKING A LAMINATED FERRITE MEMORY
Chandler Wentworth, Princeton, N.J., assignor to RCA Corporation, a corporation of Delaware
Filed Oct. 20, 1965, Ser. No. 498,732
Int. Cl. C03b *29/00;* C04b *33/34, 37/00*
U.S. Cl. 156—89 6 Claims

ABSTRACT OF THE DISCLOSURE

A method of making a laminated ferrite memory is disclosed in which a forming punch having a raised pattern, corresponding with a desired conductor pattern, is pressed against a plain green ferrite sheet to form a corresponding depression pattern therein. A slurry of conductive particles and a vehicle is spread over the depression pattern, and excess conductive material is removed. The conductive material in the depression pattern has accurate dimensions determined by the forming punch. The ferrite sheet is then laminated with other green ferrite sheets and fired to form a homogeneous sintered ferrite body with imbedded conductors.

The invention described herein was made in the performance of work under a NASA contract and is subject to the provisions of Section 305 of the National Aeronautics and Space Act of 1958, Public Law 85–568 (72 Stat. 435; 42 USC 2457).

This invention relates to magnetic memories such as are useful in electronic data processing equipment, and particularly to a method of making a laminated ferrite memory array consisting of a body of sintered magnetic ferrite having imbedded conductors.

Laminated ferrite memories are constructed by doctor blading a ferrite slurry on a flat substrate, drying the slurry to form a thin leather-like sheet of green ferrite, depositing patterns of conductive paste or powder on green ferrite sheets, laminating the ferrite sheets to enclose the conductive patterns, and firing the lamination to form a homogeneous body of sintered ferrite having imbedded conductors.

In the above briefly-described method, the conductive material used for forming the conductive patterns is a paste or powder of a metal having a melting point higher than the sintering temperature of the ferrite. Conductive paste or powder is used because the ferrite shrinks when fired, and the ferrite cracks if a solid conductor is imbedded in it. The need to initially use conductive paste or powder, rather than solid conductors, greatly complicates the achievement of dense, low-resistance, small cross-section, elongated, accurately-spaced conductors imbedded without voids in the final sintered ferrite product.

The initial paste or powder conductors are difficult to form with the desired accuracy and uniformity, and once formed the paste or powder conductors tend to be deformed when the green ferrite sheets carrying the conductors are pressure laminated. Furthermore, the firing of the lamination to sinter the ferrite causes shrinkage of the ferrite which affects the uniformity of the conductors. The achievement of greater uniformity in the construction of a laminated ferrite memory array is desired because it results in greater reliability and speed in the storing and recovering of information from the many elemental magnetic storage locations in the array.

It is therefore a general object of this invention to provide an improved method of making a laminated ferrite memory array including elongated imbedded conductors having small cross sectional areas, substantially equal cross sectional dimensions, high conductivity and high dimensional uniformity.

In accordance with an example of the invention, a male die or forming punch is used which has a raised pattern corresponding with a desired pattern of conductors in a memory array. The punch is installed in a press, heated to a temperature of about 90° C., and coated with an aqueous solution of detergent which is allowed to dry. The punch is then pressed against a plain sheet of doctor bladed green ferrite with a force of about 3000 pounds per square inch for about 30 seconds. The press is opened and the formed green ferrite sheet is easily separated from the punch after being soaked with water. The grooves pressed in the green ferrite sheet are filled with a conductive paste or powder consisting of a binder and particles of a metal having a melting point above the sintering temperature of the ferrite. A plurality of such green ferrite sheets are laminated by the application of heat and pressure, and finally the lamination is fired to drive out binders and sinter the ferrite.

Figures 1, 2, 3:
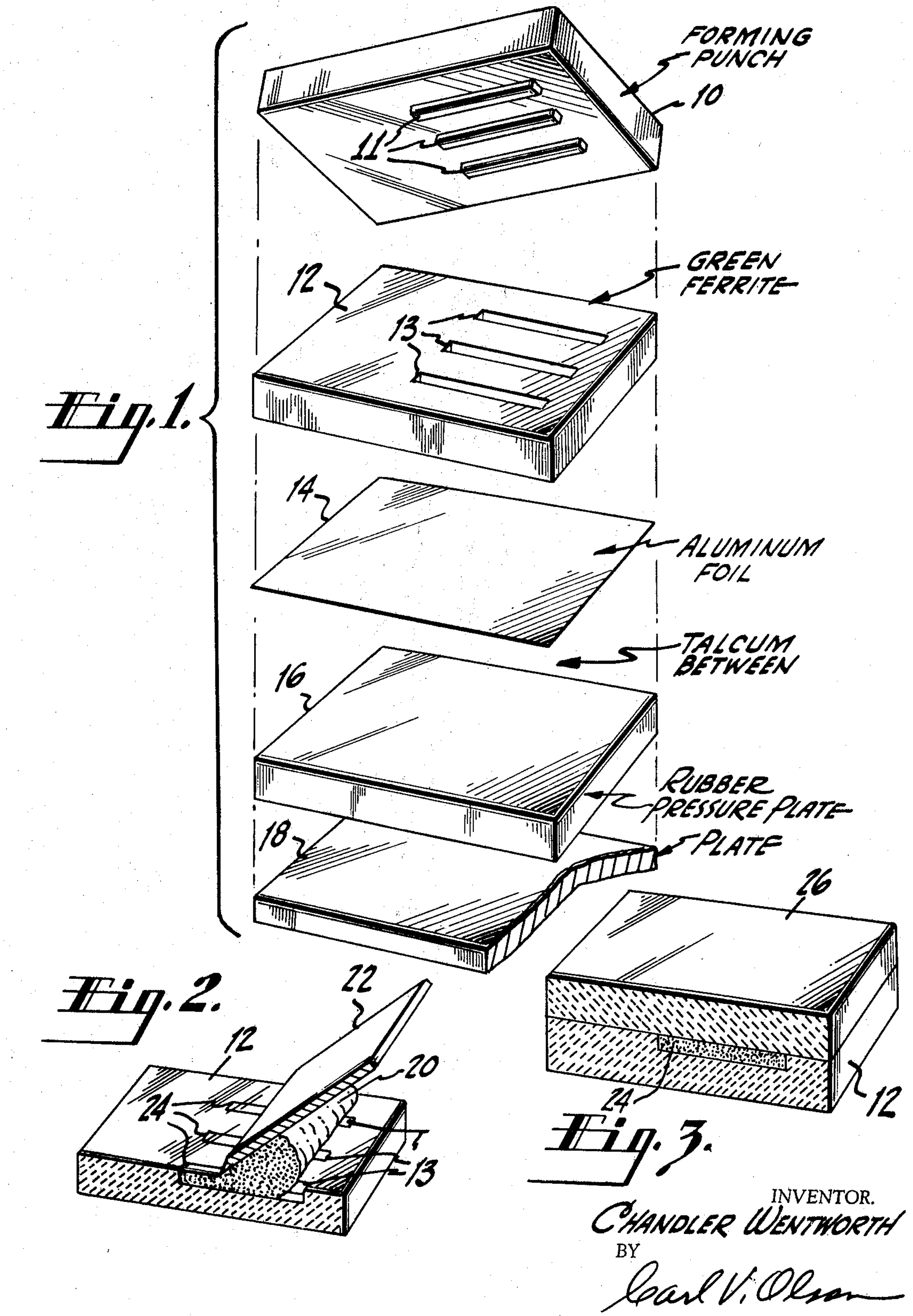
FIG. 1 is an expanded view of parts involved in pressing grooves in a green ferrite sheet.
FIG. 2 is a perspective fragmentary view showing the filling of grooves in a ferrite sheet with conductive particles in paste form.
FIG. 3 is a perspective fragmentary view showing a second plain ferrite sheet laminated to the ferrite sheet shown in FIG. 2.

Reference is now made in greater detail to FIG. 1 of the drawing which is an expanded view showing a male die or punch 10, a green ferrite sheet 12 containing an impression formed by the punch 10, an aluminum foil 14, a rubber pressure plate 16 and a flat steel plate 18. The recited elements are arranged in the order shown between the ram and bed of a conventional press.

The punch 10 is constructed as follows: Grooves are cut in a plastic blank in a pattern corresponding with the desired pattern of conductors in the laminated ferrite memory. The grooves are cut by the movement of a tool having a chisel-shaped cutting edge with a width of about 2 milli-inches. The tool cuts a groove having a depth also of about 2 milli-inches. The grooves may be spaced about 8 or 10 milli-inches apart. Nickel is electroplated on the grooved plastic blank to a thickness sufficient to fill the grooves and extend uniformly over the surface of the grooved plastic blank. The resulting nickel male die or punch is removed from the grooved plastic blank and a thin layer of chromium is electroplated on the raised pattern side of the nickel punch to provide a hard, smooth, wear-resistant surface. The resulting punch may, as illustrated at 10 in FIG. 1, have very small elongated, accurately-dimensioned and spaced protrusions 11 in the pattern of desired conductors.

The plain sheet 12 of green ferrite to be acted upon by the punch 10 is formed by making a ferrite powder, making a ferrite slurry from the powder, applying the ferrite slurry to a flat substrate and drawing a doctor blade accurately spaced from the substrate over the slurry to give it a uniform thickness. The doctor bladed slurry is then allowed to dry, in the process of which it shrinks and becomes a thin leather-like sheet of green ferrite.

A batch of ferrite powder may be made from 244.0 grams of zinc oxide, 309.2 grams of magnesium carbonate (heavy grade), 823.0 grams of iron oxide ($Fe_2O_3$), and 344.4 grams of manganese carbonate. These materials plus 1900 $cm.^3$ of methyl alcohol are placed in a steel mill of 6-inch I.D., 10.5 inches deep, and charged with 7 kg. of ¾-inch steel balls. This charge is milled for two to three hours at 100 r.p.m. After milling, the mixture is dried at 150° C., passed through a 4-mesh screen, and placed in fireclay crucibles for calcining. In calcining, the material is heated to 1900° F. in 4 hours, held for 2½ hours and cooled with the kiln. The calcining atmosphere is air in a globar kiln. The calcined powder is placed in the same mill used for mixing, 2000 $cm.^3$ of methyl alcohol are added, and the mixture is milled for 20 hours. After drying, the material is ready for use in preparing the blading slurry.

A batch of ferrite slurry may be made from a mixture of 640 grams of the calcined ferrite, 44 grams of polyvinyl butyral resin available under the name Butvar 76, 20 grams of Flexol D.O.P., 4 grams of trimethyl nonyl ether of polyethylene glycol such as is sold by Union Carbide Co. under the name Tergitol non-ionic TMN, and 580 $cm.^3$ of methyl ethyl ketone. The mixture is milled for 20 hours. After milling, the slurry is put into a glass jar and rolled at 12 r.p.m. until ready for use. Before use, the slurry is passed through a 200-mesh screen to remove undissolved or unmixed clumps.

The plain sheet 12 of green ferrite to be acted on by the male die or forming punch 10 is made by drawing the doctor blade over a pool of slurry on a suitable substrate surface. The adherence of the slurry to the substrate must be sufficient to prevent lateral shrinkage; all shrinkage should be vertical. Glass and silicone rubber have been found to be the most suitable substrates. The vertical drying shrinkage ranges from 5:1 to 7:1. Thus, to obtain a 3-mil thick sheet, a doctor blade setting of 15 to 20 mils must be used. This ratio depends upon the viscosity of the slurry and the speed of draw of the blade. The specific gravity of the bladed unfired sheet is about 2.8. During drying of the sheet, care must be taken to prevent draughts across the sheet. Draughts cause uneven drying and can cause the film to crack or craze. Drying should be slow enough to allow drying to occur from the bottom to the top. If the top dries first, lateral shrinkage takes place on the surface causing orange peeling and crazing. Thorough wetting of the dried film with water greatly facilitates release of the dried green ferrite sheet from the substrate.

The plain green ferrite sheet 12 is placed in a conventional press between the male die or punch 10 and the aluminum foil 14. Talcum powder is spread between the aluminum foil 14 and the rubber pressure plate 16 to act as a lubricant in preventing lateral spreading of the rubber pressure plate from being transmitted through the aluminum foil to cause a spreading of the green ferrite sheet when the press is closed. The punch 10 is heated to a temperature of about 90° C. A 10 percent aqueous solution of a detergent such as trimethyl nonyl ether of polyethylene glycol also known as "Tergitol" made and sold by Union Carbide Co. is applied to the surface of the punch 10 and allowed to dry.

The parts shown in FIG. 1 are guided in the press by means (not shown) which permit vertical movement of the parts, and prevent lateral movements. This may be accomplished by the usual guide pins or a guide frame engaging all four sides of the parts. The punch 10 is pressed against the green ferrite sheet with a force of about 3,000 pounds per square inch for a period of about 30 seconds to impress a depression pattern 13 on the surface of the green ferrite sheet 12. In addition to forming the desired depression pattern 13, the punch 10 acts to uniformly compact and increase the density of the green ferrite sheet 12.

When the press is opened, the green ferrite sheet 12 adheres to the punch 10 but is easily separated from the punch 10 after being soaked with water. The water passes easily through the green ferrite sheet 12 and redissolves the dried detergent on the surface of the punch. The resulting aqueous solution of detergent on the surface of the punch acts as a releasing agent so that the green ferrite sheet can easily be removed from the punch. The removed green ferrite sheet 12 formed as shown in FIG. 1 is washed in water and allowed to dry.

FIG. 2 illustrates a following step in which the grooves 13 in the green ferrite sheet 12 are filled with a conductive paste 20 consisting of a binder and particles of a conductive metal having a melting temperature higher than the final firing temperature of the ferrite. The grooves 13 are filled with the conductive paste 20 by depositing the paste on the surface of the ferrite and drawing a blade 22 over the surface of the ferrite to force the paste in the grooves 13 and to remove excess paste from the surface of the ferrite. The conductive paste 24 remaining in the grooves 13 is very accurately and uniformly dimensioned by the very accurately and uniformly dimensioned grooves 13 in the green ferrite sheet. The accuracy and uniformity of the grooves 13 was previously determined by the action of the male die or punch 10. It is thus seen that the conductive paste, which itself has poor dimensional stability, is constrained in the grooves 13 to have great dimensional accuracy and uniformity.

FIG. 3 shows a second plain green ferrite sheet 26 laminated over the surface of the ferrite sheet 12 having the flush imbedded conductive paste pattern 24. The lamination of the green ferrite sheets 12 and 26 is accomplished by the application of heat at a temperature of about 90° C. and pressure at about 2000 pounds per square inch. A laminate as shown in FIG. 3 will normally be made from more than two green ferrite sheets.

The laminated structure shown in FIG. 3 is then fired in air to 2300° F. for two hours, after which the ferrite is allowed to cool with the kiln. In the process, the binders in the green ferrite and in the conductive paste are driven off. The shrinking of the ferrite compresses the conductive particles together to form dense metallic conductors. Annealing is accomplished in a nitrogen atmosphere at a temperature of 2050° F. for eight hours, after which the ferrite is allowed to cool with the kiln. The resulting product is a body of uniform homogeneous sintered ferrite having imbedded solid conductors in the desired pattern or patterns.

Figure 4:
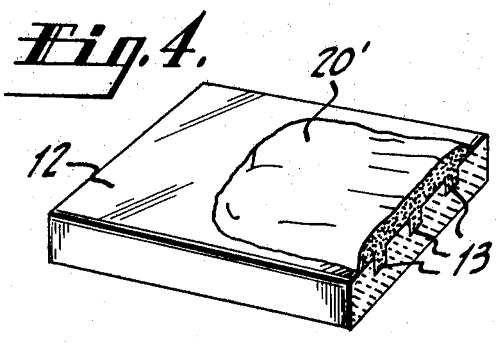
FIGS. 4 and 5 are perspective views illustrating an alternative method of filling grooves in a green ferrite sheet with conductive particles.
Figure 5:
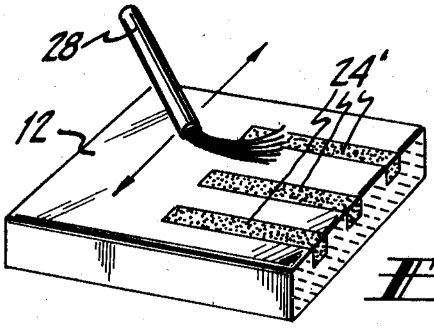

FIGS. 4 and 5 illustrate an alternative method of filling grooves 13 in the green ferrite sheet 12 with conductive particles. A slurry 20′ of conductive metallic particles mixed with an aqueous solution of a carbonaceous binder (such as confectionary sugar) is applied to the surface of the green ferrite sheet over the grooves 13. The slurry is allowed to dry and the lightly-bound metallic particles are brushed from the surface of the ferrite with a brush 28 as shown in FIG. 5. The lightly-bound conductive particles remain in the grooves in a pattern 24′ conforming accurately with the dimensions of the grooves in the green ferrite sheet 12.

Figure 6:
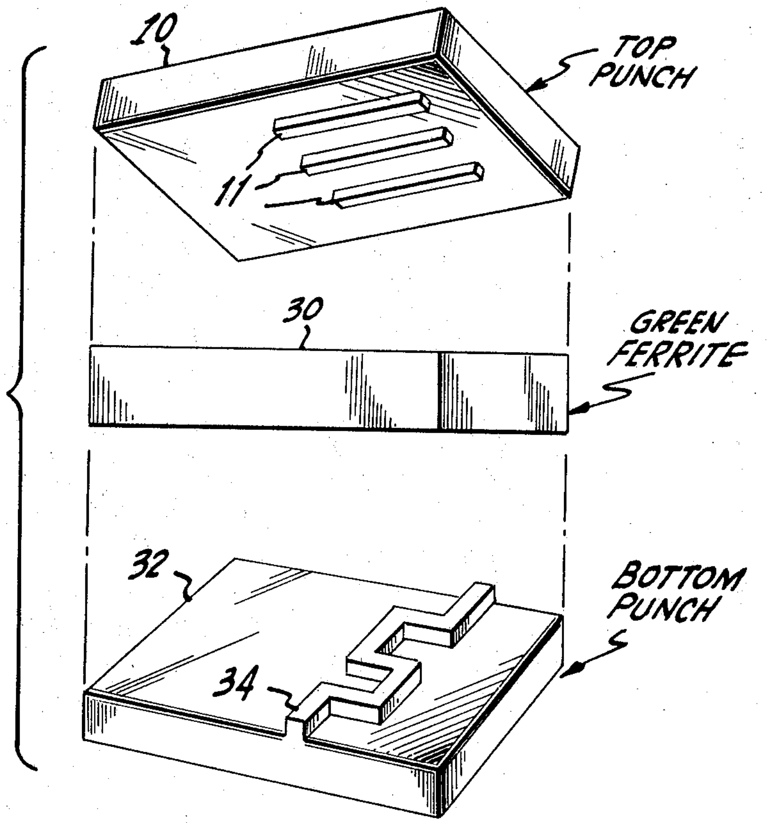
FIG. 6 is an expanded view of parts involved in simultaneously pressing registered grooves in both sides of a green ferrite sheet.

FIG. 6 is an expanded view illustrating a green ferrite sheet 30 interposed between a top male die or punch 10 and a bottom plate in the form of a male die or punch 32. Top punch 10 and bottom punch 32 are used to simultaneously form depression patterns on both respective sides of the green ferrite sheet 30. The bottom punch 32 is shown as having a raised pattern 34 including three portions extending in parallel registry with three respective raised portions 11 of the top punch 10. The top punch 10 and the bottom punch 32 are installed in a die set having accurate guide means to maintain the described registry of the raised patterns. The green ferrite sheet 30 is compressed between the punches 10 and 32 in the manner described in connection with FIG. 1.

Figure 7:
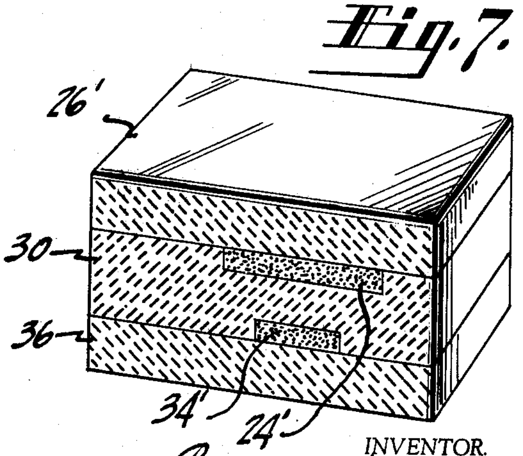
FIG. 7 is a perspective fragmentary view showing two plain ferrite sheets laminated to the two sides of the ferrite sheet shown in FIG. 6.

The patterns of depressions on both sides of the green ferrite sheet 30 are filled with conductive paste or powder following one of the methods described in connection with FIGS. 2, 4 and 5. The green ferrite sheet 30 is then laminated, as shown in FIG. 7, with a second plain green ferrite sheet 26' and a third plain green ferrite sheet 36, following the procedure described in connection with FIG. 3. Finally, the laminated structure shown in FIG. 7 is fired to drive off binders and to sinter the ferrite in the manner which has already been described. The parallel extending conductive portions 24' and 34' shown in FIG. 7 are made, in the final product, to have a very high degree of registration accuracy.

The desired registration accuracy can be made to exist between corresponding conductive portions in a relatively large sheet having many more conductors than are illustrated in the drawing. Dimensional and registration accuracy of the conductors in a laminated ferrite memory array is extremely important in achieving reliable and fast operation at all of the many elemental information storage locations determined by crossovers of the imbedded conductors. A superior memory can be made following the described method because it facilitates the construction of imbedded conductors having the desired dimensional accuracy and uniformity.

What is claimed is:

1. The method of making a laminated ferrite magnetic memory including a body of uniform homogeneous sintered ferrite having imbedded small cross-section elongated conductors, comprising the steps of heating a forming punch having a raised pattern conforming with the desired pattern of conductors to a temperature of about 90° C., compressing a first sheet of green ferrite between a plate and said punch with a force of about 3000 pounds per square inch for about 30 seconds, separating said punch and plate, removing the first ferrite sheet from said punch and filling the depressions in the ferrite sheet with a mixture of conductive particles and a binder, laminating a second sheet of green ferrite to the surface of the first ferrite sheet having the conductively filled depressions, and firing the lamination to drive out binders and sinter the ferrite.

2. The method as defined in claim 1 wherein said forming punch is initially coated with an aqueous solution of detergent which is dried before the punch is pressed against the first ferrite sheet.

3. The method as defined in claim 2 wherein water is applied to the first ferrite sheet to facilitate its separation from said forming punch.

4. The method as defined in claim 1 wherein a metallic foil, talcum powder and a rubber pressure plate are inserted in the order named between said first ferrite sheet and said plate.

5. The method as defined in claim 1 wherein said first sheet of green ferrite is compressed between said forming punch and a plate in the form of a second forming punch, wherein the depressions on both sides of the first ferrite sheet are filled with a mixture of conductive particles and a binder, and wherein second and third green ferrite sheets are laminated to the two surfaces of the first ferrite sheet.

6. The method as defined in claim 5 wherein said forming punches have raised patterns including registered portions.

References Cited

UNITED STATES PATENTS

| | | | |
|---|---|---|---|
| 2,431,720 | 12/1947 | Willey | 74—255 |
| 2,757,443 | 8/1956 | Steigerwalt et al. | 29—625 |
| 2,801,150 | 7/1957 | Koryta | 264—338 |
| 2,984,887 | 5/1961 | Thiess | 264—338 XR |
| 3,228,091 | 1/1966 | Rice et al. | 156—289 XR |
| 3,333,333 | 8/1967 | Noack | 156—89 XR |
| 3,333,334 | 8/1967 | Kuliczkowski et al. | 156—89 XR |

HAROLD ANSHER, Primary Examiner

H. F. EPSTEIN, Assistant Examiner

U.S. Cl. X.R.

29—530, 604, 625; 156—250, 289, 583; 174—68.5; 264—338; 340—174